United States Patent
Touma et al.

[11] Patent Number: 6,160,549
[45] Date of Patent: *Dec. 12, 2000

[54] METHOD AND APPARATUS FOR GENERATING REPORTS USING DECLARATIVE TOOLS

[75] Inventors: Andre Touma, Redwood Shores; Richard Davis, Half Moon Bay; David Simson, Burlingame; Marco Tilli, Hayward; Steve Breyer, San Mateo, all of Calif.

[73] Assignee: Oracle Corporation, Redwood City, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/785,856

[22] Filed: Jan. 21, 1997

Related U.S. Application Data

[63] Continuation of application No. 08/282,286, Jul. 29, 1994, abandoned.

[51] Int. Cl.[7] .................................................... G06F 13/00
[52] U.S. Cl. .................................. 345/333; 707/3; 707/5; 707/102
[58] Field of Search .................................... 345/302, 326, 345/333, 334, 335, 339, 340, 342, 348, 349, 964, 965, 966, 967, 968; 707/102, 103, 501, 502, 503, 505, 506, 508, 509, 514, 517, 522, 527, 906, 908, 3–5

[56] References Cited

U.S. PATENT DOCUMENTS

| | | | |
|---|---|---|---|
| 4,656,603 | 4/1987 | Dunn | 345/348 |
| 4,710,885 | 12/1987 | Litteken | 707/513 |
| 4,723,210 | 2/1988 | Barker et al. | 707/514 |
| 4,723,211 | 2/1988 | Barker et al. | 707/514 |
| 4,813,013 | 3/1989 | Dunn | 345/333 |
| 4,815,029 | 3/1989 | Barker et al. | 707/516 |
| 4,823,303 | 4/1989 | Terasawa | 707/515 |
| 5,040,131 | 8/1991 | Torres | 345/352 |
| 5,134,560 | 7/1992 | Ferriter et al. | 364/188 |
| 5,596,691 | 1/1997 | Good et al. | 345/440 |
| 5,615,367 | 3/1997 | Bennett et al. | 345/326 |
| 5,651,108 | 7/1997 | Cain et al. | 345/340 |

*Primary Examiner*—Ba Huynh
*Attorney, Agent, or Firm*—Blakely, Sokoloff, Taylor & Zafman, LLP

[57] ABSTRACT

The present invention is a method and apparatus for declarative report definition and generation using an enhanced, graphical data model and a graphical user interface (GUI) for graphically specifying data items and data computations to be performed on the data is described. It provides a set of data model objects, a data model painter for creating, defining, and visualizing the data model objects, and a data engine that retrieves the data according to the definition of the data objects. That is, the present invention provides a graphical data model allowing a user to graphically specify both the data and computations to be performed on the data and uses the layout metaphor (i.e., "painter") to specify the data. Data model objects include: queries, groups, columns, parameters, cross products, and links. Unlike the prior art, allows the use of multiple queries each containing one or more break groups and cross product groups where groups belonging to two different queries are connected by link objects. The resulting structure is therefore a forest of groups where each group contains one or more columns, thereby enlarging the scope of report definition tools available to users.

27 Claims, 8 Drawing Sheets

| Deptno | Job | Ename | Sal |
|---|---|---|---|
| 30 | Clerk | James | 950.00 |
|  | Manager | Blake | 2850.00 |
|  | Salesman | Ward | 1250.00 |
|  |  | Martin | 1250.00 |
|  |  | Turner | 1500.00 |
|  |  | Allen | 1600.00 |
| 20 | Analyst | Scott | 3000.00 |
|  |  | Ford | 3000.00 |
|  | Clerk | Smith | 800.00 |
|  |  | Adams | 1100.00 |
|  | Manager | Jones | 2975.00 |
| 10 | Clerk | Miller | 1300.00 |
|  | Manager | Clark | 2450.00 |
|  | President | King | 5000.00 |

Fig. 3

METHOD AND APPARATUS FOR GENERATING REPORTS USING DECLARATIVE TOOLS

This is a continuation of application Ser. No. 08/282,286, filed Jul. 29, 1994 now abandoned.

BACKGROUND OF THE INVENTION

1. Field of the Invention

The present invention relates to field of declarative, report-generation tools.

2. Background Art

In the prior art, a report writer generates textual reports or graphical reports or both from selected data in a database. The reports are produced using a report definition that includes a layout definition and a data definition. In the prior art, the report definition is accomplished by writing procedural code using programming languages or description languages, i.e., a programmer writes instructions to define a report.

Report generation tools emphasizing report layout have evolved from the script- and language-driven tools, described above. Such prior art systems, which do not require knowledge of a script or programming language, allow the definition of report layout in a declarative manner. These systems provide a graphical tool for specifying the layout of a report, i.e., the formatting of the report. To define the report layout, an input device (e.g., mouse) allows a user to position objects on a screen. The prior art declarative systems use non-programming tools for defining the overall layout of the report, i.e., the positioning of data, headers, footers, etc. Thus, the prior art focuses on the layout aspect of a report, providing visual and interactive tools so that users may create and define the properties of layout objects.

Prior art systems have not focused on the data aspect of a report, and in fact, most prior art systems assume that the data for a report is obtained using a single query. A query is a Structured Query Language (SQL) statement (i.e., a "select" statement) that defines which rows and columns from specified relations or views are to be fetched from a database(s).

The following are patents related to tools for generating reports:

Litteken discloses a method of formatting graphics in a document using a textual markup language and a tag. A tag associates a series of formats for the associated portion of the document. The particular tag described in Litteken provides for the drawing of rectangular boxes with rounded corners to simulate computer screens. The text enclosed within the box determines the scope of the box. A database is used to store document format information such as headings and figures.

Barker '210 and '211 disclose a facility for integrating different data types, or data objects, on a page of a document. Examples of objects include text and non-text objects such as: graphic objects, block objects (e.g., a block of characters), and table objects (e.g., characters in tabular form). Each object set has a data structure for its type. A superblock, which is a displayable area containing two or more object sets positioned so that the object sets overlap one another, allows a user to manipulate object sets as a group within a single displayable area on a page. Barker discloses an editor for manipulating a superblock or objects sets within a superblock. Examples of such manipulations include: create, move, copy, paste, get, delete, and describe.

Dunn discloses a schematic diagram generating system using a library of graphic icons with associated graphic and/or function primitives. Whenever an icon is selected in the process of building a schematic diagram, the rule set is accessed to control the employment and manipulation of the icon in the current diagram.

Barker '029 describes a method for editing documents containing mixed data objects (e.g., text, graphics, business graphics, and tables objects). The invention provides functionality for document formatting, object positioning, simple text editing, move, copy, delete, search/replace, go to, get, describe, create. Some commands may be used to perform operations on any type of object, while other commands are limited to certain object types.

Terasawa describes an apparatus for processing composite (i.e., integrated) documents. The apparatus includes multiple memories for storing document, attribute (e.g., composite document location, and the area, size, and type of data stored in document memory), window/viewport (i.e., display attributes such as size of window and viewport), and video (i.e., display or image) information. Two viewports are provided, where the first contains the entire document and the second contains some subset of the entire document. Updates made in one viewport result in updates to the image in memory, and are reflected in both viewports.

Yamaguchi refers to a system for processing composite documents (i.e., documents containing multiple types of data such as text and image). The system contains three storage sections that are used to generate a composite document: format-data, reference-data, and layout. The format-data section stores form-data such as region-attribute data. A text portion of a document can reference an image. The reference-data section stores information about the relationship between an image reference contained in text data and the referring text. The data layout contains information for laying out the text data and the image data.

Torres refers to a system for performing computations on data in a table using graphic icons that represent certain operations (e.g., sum, mean, and standard deviation) that can be performed on the data. The result of the operation can be displayed on the screen by placing the selected icon at a location on the screen.

Ferriter describes a system and method for generating manufacturing process plans. The system contains a library of icons that represent manufacturing process steps. Each icon has an associated set of stored textural instructions. Icons can be selected to detail the manufacturing process for a selected product. A visual image of the product to be manufactured is marked with reference numbers that correspond to each textual instruction.

Thus, while report-generation tools have evolved from script- and language-driven tools to visual, interactive, declarative tools, the prior art emphasizes the layout aspect of reports but not the data aspect of reports. The prior art tools allow a user to visually and interactively create and define the properties of layout objects, thereby greatly enhancing the ease with which a report is laid out. However, the prior art insufficiently addresses the data aspect of reports, with most tools disadvantageously assuming that the data for a report comes from a single query.

SUMMARY OF THE INVENTION

The present invention is a method and apparatus for declarative report definition and generation using an enhanced, graphical data model and a graphical user interface (GUI) for graphically specifying data items and data computations to be performed on the data is described. It provides a declarative report definition tool that uses objects to define both layout and data aspects of a report. The graphical user interface is used to facilitate specification of the layout aspect and the data aspect of the report. Unlike the prior art, the present invention provides a graphical data model allowing a user to graphically specify both the data and computations to be performed on the data and uses the layout metaphor (i.e., "painter") to specify the data. Data model objects include: Column, Cross Product, Group, Link, Parameter, and Query. Unlike the prior art, the present invention uses a tree of queries as well as links, cross products, groups, and columns. This enlarges the scope of report definition tools available to users. A report definition is assembled by building objects and giving attributes to these objects.

The present invention has a robust set of data model objects, provides a capable data model painter for creating, defining, and visualizing the data model objects, and has a powerful data engine that retrieves the data according to the definition of the data objects. Due to the inherent intricacies between the layout and data aspects of a report, aspects of the layout engine are presented to address the enlarged scope of the data engine of the present invention.

The present invention provides a tool for developing, displaying and printing reports using a non-procedural, declarative approach that fully shifts the emphasis in report definition from program development to report design for both layout and data aspects. It also facilitates maintenance of existing reports. Thus, the declarative approach of the present invention for the enhanced data model provides an environment where a report definition is assembled by building objects and giving attributes to these objects.

BRIEF DESCRIPTION OF THE DRAWINGS

FIG. 3 illustrates report output using break groups;

DETAILED DESCRIPTION OF THE INVENTION

A method and apparatus for declarative report definition and generation using an enhanced, graphical data model and a graphical user interface for graphically specifying data items and data computations to be performed on the data is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention provides a declarative report definition tool that uses objects to define both layout and data aspects of a report. The layout aspect specifies the format of the report, i.e., the physical layout of the data in the report, and the data aspect identifies the data contained in the report. Unlike the prior art, the present invention provides a graphical way to specify both of these report aspects using an enhanced, graphical data model with a report writer that allows a user to graphically specify the data items and data computations to be performed on the data. That is, a graphical user interface (GUI) is used to facilitate specification of the layout aspect and the data aspect of the report. The enhanced data model includes the following data model objects, described in detail below: Column, Cross Product, Group, Link, Parameter, and Query. Unlike the prior art which assumed that data is obtained using a single query, the present invention allows the use of multiple queries each containing one or more break groups and cross product groups where groups belonging to two different queries are connected by link objects. The resulting structure is therefore a forest of groups where each group contains one or more columns, thereby enlarging the scope of report definition tools available to users. The present invention has a robust set of data model objects, provides a capable data model painter for creating, defining, and visualizing the data model objects, and has a powerful data engine that retrieves the data according to the definition of the data objects.

In order to provide a fuller description of the present invention for providing enhanced data model objects and tools, a detailed description of the layout aspect is also provided. Layout objects include: Anchor, Boilerplate (Arc, Ellipse, Freehand, Line, Polygon, Polyline, Rectangle, Rounded Rectangle, and Text Boilerplate objects), Boilerplate Link, Chart Display, Field, Frame, Matrix, and Repeating Frame. Other graphic objects and graphic manipulations can be specified in the report definition. The present invention also provides a set of attributes, or properties, that are applied to these objects. A report definition is assembled by building objects and giving attributes to these objects.

Graphical User Interface

Figure 1:
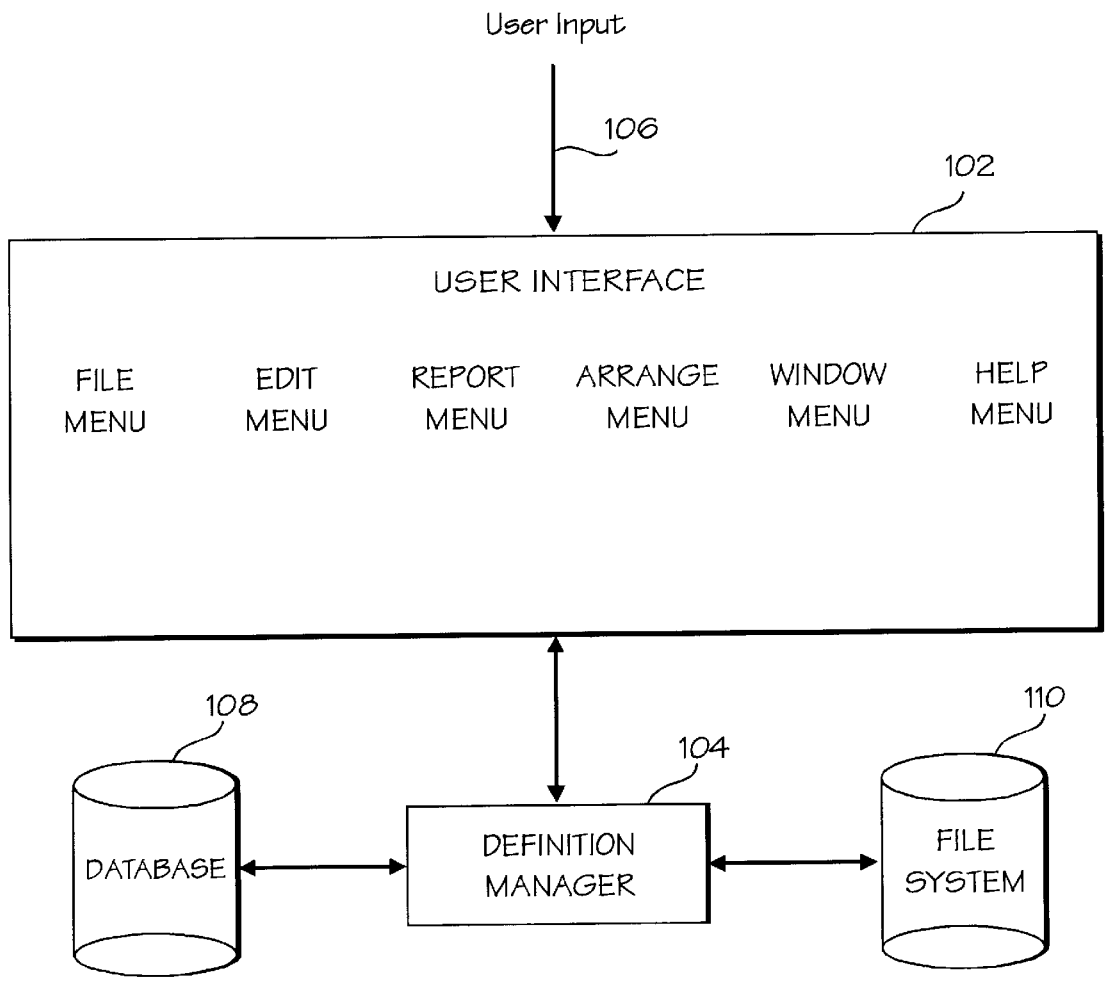
FIG. 1 illustrates an example of a graphical user interface (GUI) for specifying report definition.

The graphical user interface implements all of the menus, screens, property sheets, dialogs, painters, and editors that are used to define a report. FIG. 1 illustrates an example of a GUI layout 102 for accepting user input 106 and specifying input to a report definition manager 104. User input 106 is supplied to user interface 102, which provides multiple menus for defining a report including File, Edit, Report, Arrange menu, Window menu, and Help menus. A definition manager 104 accepts the definition input and can store the report definition in a database 108 or file system 110.

Figure 2A:
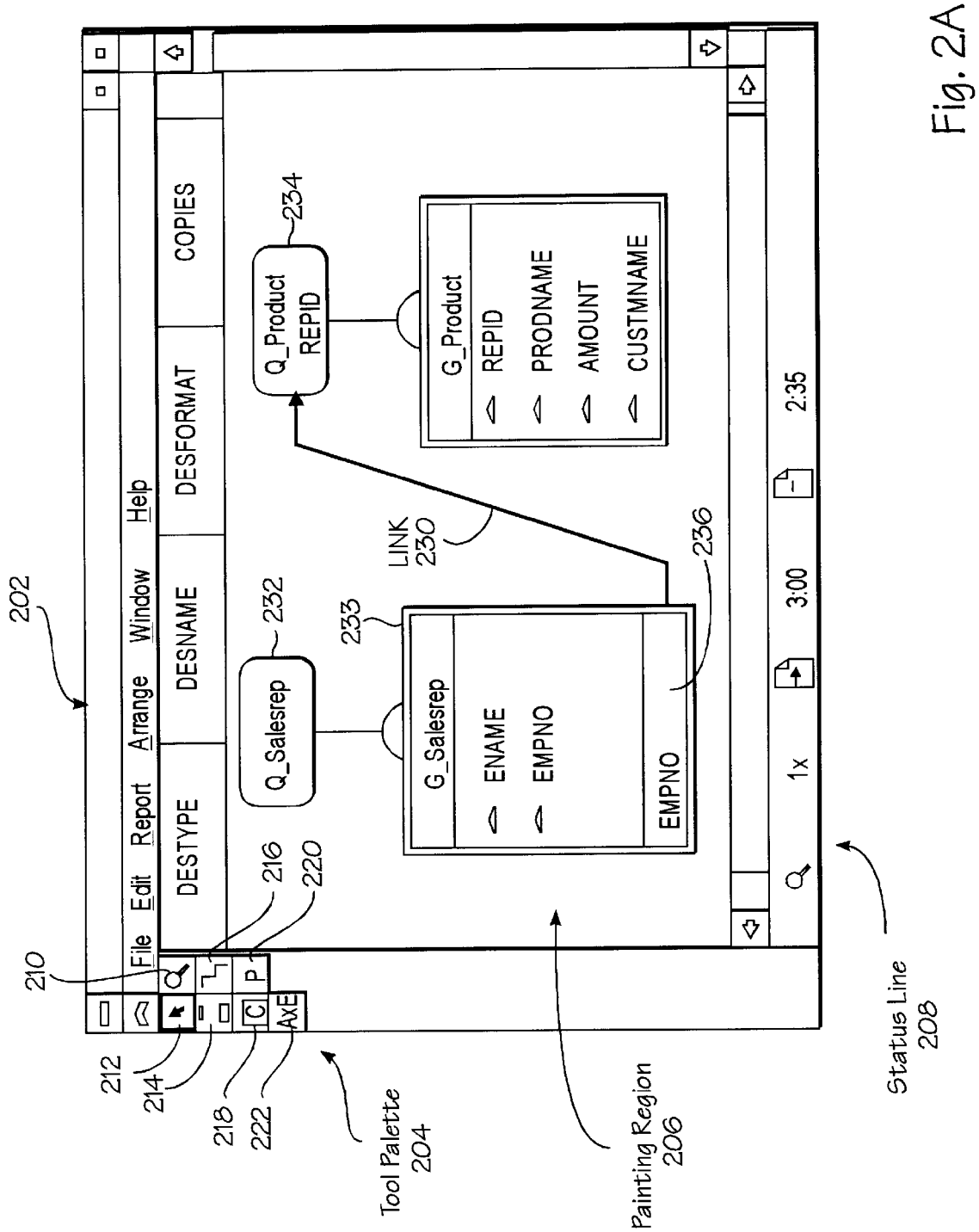
FIG. 2A illustrates an example of a data model painter.
Figure 2B:
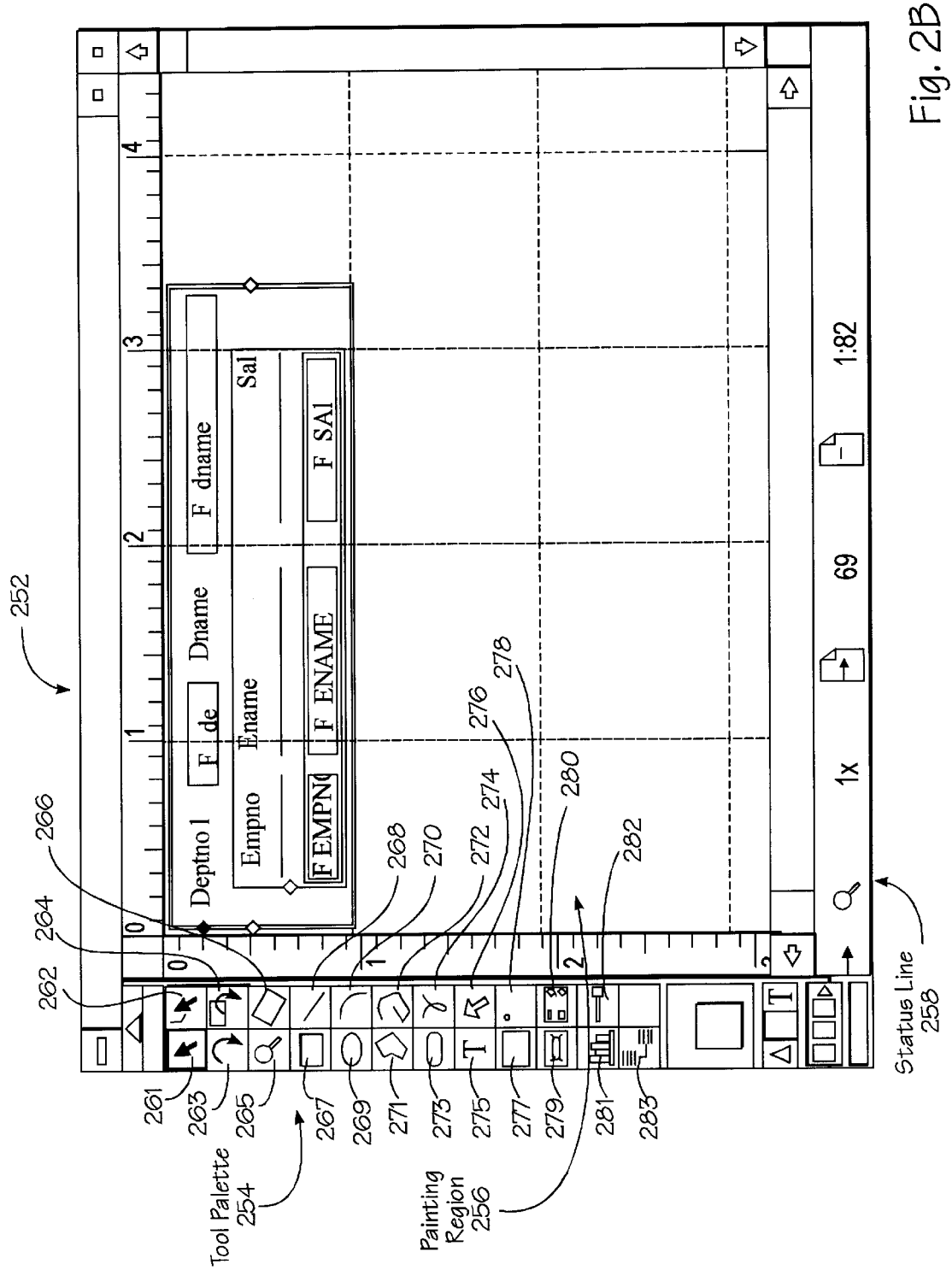
FIG. 2B illustrates a layout painter for specifying the layout objects of a report layout.

Unlike the prior art, the GUI 102 provides data model and layout model painters (containing front-end tools) to facilitate both the data model and layout model definitions. In the present invention, the data model painter is a work area for defining data to be included in a report. The layout model painter is a work area for specifying the layout objects of the report layout. FIGS. 2A and 2B illustrate an example of a data model painter and a layout model painter, respectively. While a particular data model painter is illustrated in FIG. 2A, other formats for a data model painter can be used with the present invention without departing from the scope of the present invention.

The Data Model and the Data Model Painter of the Present Invention

FIG. 2A illustrates a data model painter 202 according to the present invention containing a tool palette 204, a painting region 206, and a status region 208. The painting region 206 is the area in which objects can be created, modified, and positioned using graphical representations of the objects. Properties for an object can be viewed by selecting, i.e., "double-clicking", on an object in the painting region 206. When an object is selected, its properties are displayed in a properties dialog box. The status line 208 provides information to the user regarding operations or objects or both.

The tool palette 204 contains such tools as magnify tool 210 and selecting tool 212 (i.e., pointer used to select objects in the painting region). It further contains tools for creating data model objects. Examples of tools to create data model objects include: query tool 214, link tool 216, computation tool 218, parameter tool 220, and cross product tool 222. The query tool 214 is used for creating a new query. The link tool 216 is used for drawing a link between a parent group (groups are described below) and a child query. The computation tool 218 is used for creating a new summary, formula, or place holder column in the data model. The parameter tool 220 is used for creating a new parameter. The cross product tool 222 is used for creating a cross product group around two or more groups, where a cross product is a group that owns two or more other groups and performs a mathematical cross product, i.e., correlates values between the groups. Once a data model object is created using one of these tools 212–222 from the tool palette 204, its properties can be defined.

The data aspect, or data model, of the present invention is composed of data definition objects that can be defined for a report using the GUI. These data model objects of the present invention provide the ability to select data items, describe the relationships between data items, and perform computations using the data item selections. With respect to the data model tools 214–222 of FIG. 2A described above, the data model objects include: Column, Cross Product, Group, Link, Parameter, and Query. There is another type of object called break group not created using a tool.

Column

A column is created with the column tool. A column data object is owned by a group and is automatically created for each select element specified in a query. It is placed in the group associated with the column's query. Columns can further be created to perform summaries and computations on column values or to act as place holders. Column properties include: Break Order, Comment, Compute At, Datatype, Format, Formula, Function, Name, Product Order, Read From File, Reset At, Source, Type, Value If Null, and Width.

The Break Order property of a column identifies the order, for example, ascending or descending, in which to display the column's values. The Break Order affects columns in groups that are above the lowest child group of a query and only affects the ordering of the column on which a break occurs. It does not affect the ordering of the other columns within the break group.

For example, FIG. 3 illustrates report output based on a report definition having a query that selects department number, job description, employee name, and employee salary data items from an employee table. Further, two break groups, G_DEPTNO and G_JOB, are created. The G_DEPTNO contains department number column; a descending break order is selected for the break group. The G_JOB group contains the job description column and is defined in ascending order. The G_DEPTNO break group causes a break on changing values of the department number column. The descending break order for G_DEPTNO column causes the department numbers to be output in descending order. Similarly, the G_JOB causes a break (within a department number group) on changing values of the job description column. The job description values are listed (within a department number group) in ascending order. No ordering was specified for the employee name field. Therefore, where there are multiple occurrences of employee name column values for a job description, there is no specified order.

The Comment property of a break group can be used to document the column. The "Compute At" property is used to identify the group over which a "% of total" summary column is computed. The Datatype property defines the column's data type. The Format specifies the format of the object being retrieved from a database or a file. Examples of Formats include: graphic, image, and text. The Formula property can be used to specify an expression or function that returns a value for the column in the case its type is set to be formula. See below for definitions of type property for a column. The Function property defines the computation to be performed on the values of the column(s) if its type is set to be "summary". Examples of functions include: Average, Count, First, Last, Maximum, Minimum, Percent Of Total, Standard Deviation, Sum, and Variance. The Name property can be used to identify a column.

The Product Order property defines the order in which groups are evaluated in a cross product for a summary. It is used for columns owned by cross product groups. A cross product relates multiple groups. Therefore, the groups in a cross product can be evaluated in many different orders. The Product Order can be used to specify which group to evaluate first, second, etc. The Product Order property defines also the frequency of a summary, formula, or place holder in a cross product group.

The "Read From File" property indicates that the column contains the names of files. The contents of the files can then be imported and used as the values of the column. The "Reset At" property indicates the group at which the summary column resets to zero (for a numeric function), or null (for a non-numeric function). This property has a list of values containing valid reset groups and it determines whether a summary is a running summary or a group-level summary. Options for this property include: each group, page and report. The page option is used to specify a page-level summary. The report option can be used to specify a running summary that does not get reset through execution of the report. The Source property identifies the name of the database element retrieved in the case the type is set to be "database", or the name of the column(s) having values that are used in the computation defined by the function property.

The Type property defines the type of the column. Type database indicates that a column is selected by a query. Type formula indicates a column that performs calculations with other columns. Summary is a column type used for a column that summarizes another column. Placeholder is a dummy column type for which the datatype and value can be conditionally set. Placeholder columns can be used to implement summaries and are populated by the execution of formula columns. The "Value If Null" property contains a value to be used as a substitute value for any null values of the column. The Width property defines the maximum number of bytes that the values of the column can occupy.

Group

Group data objects organize columns in a report. A group can determine the hierarchy of the data that appears in a report and can be used to create a break in a report. One group is automatically created when a query is created, and additional groups can be created. The properties of a group include name, comment, and filter. There are two types of groups; break groups created automatically by creating queries or by pulling out a column from an existing group, and cross product groups created with the cross product tool. The name property provides the ability to identify a group by name. The comment property provides the ability to document a group. The filter property can be set to: first, last, condition, or no filter. The default is no filter. A "first" option filters out all but the first "n" distinct values of the group. A "last" option filters out all but the last "n" distinct values of the group. Condition specifies a function that determines the distinct values that are included in the group.

For example, a group is created when a query is created to select department number and employee name from an employee table. This group contains the department number and employee name columns. An additional group can be created, for example, and the department number column can be assigned to the additional group. Thus a break group is created that groups employees by department.

Link

A link is created with the link tool. A link data object is used to establish parent-child relationships between two or more queries or groups that are made using matching columns. A link enables a user to specify an SQL clause and match condition in a relationship between two columns beyond the standard SQL equijoin. A link, i.e., parent-child relationship, causes the child query to be executed once for each instance of its parent group. As defined further below, a parent column can be a database, summary, or a formula column in a parent group.

A link can be created from a parent column to a child column by clicking first on the parent and then on the child. A link can also be created from a parent group to a child query without specifying any column links. In this case, a relationship between two objects is established. However, all of the detail records appear for each master record in the parent group. Properties of a link include: parent and child column links, type and condition. The parent and child column links can be created using the method just described. The type and condition properties specify how these columns are related. For example, the clause type can be an SQL clause (e.g., having, start with, and where). The condition specifies the operator defining the relationship between the parent column and the child column. Examples of condition operators include: equal to, less than, less than or equal to, not equal to, greater than, greater than or equal to, like, and not like. The "like" operator results in a true when the value in one column matches the pattern (including wildcard positions) in the other column. The "not like" operator results in a true condition when the value in one column does not match the pattern (including wildcards) in the other column.

A link can be created using the link tool 216 from the tool palette 204 and selecting the data items that form the link. For example, in FIG. 2A, the link 230 between the G_Salesrep group and Q_Product query 232 and 234, respectively, is created by linking the EMPNO column 236 in G_Salesrep group 233 and the REPID column in Q_Product 234. Once the link 230 is defined, the properties of a link 230 can be displayed and modified by first selecting the link object (e.g., by selecting the graphical representation of the link in the painting region).

Parameter

A parameter is created using the parameter tool. A parameter data object provides the ability to change selection criteria and calculations at runtime. Parameters in a report can be equated to arguments to a procedure in a programming language. They allow the execution of a report to be affected at runtime. For example, they can determine the type and name of destinations for the report output. They can also contain single literal values for whole expressions to be inserted in one of the reports queries. They can in general affect the reports execution both in the data model and the layout. Parameter properties include: comment, datatype, initial value, input mask, name, validation trigger, and width.

The comment property provides the ability to document a parameter. The datatype property defines the data type of the parameter (e.g., character, date, or number). The "initial value" property defines the default value for the parameter. The default value is used unless it is overridden when the user runs the report. The input mask property defines the format mask that can be used to validate the initial value or the runtime-specified value of the parameter. A dialog box can be used to display a list of valid format masks. The name property identifies a name for the parameter. The validation trigger property defines a function that can be used to validate a runtime-specified value of the parameter. The width property defines the maximum number of characters for the parameter value.

Query

A query is created with the query tool. In the preferred embodiment of the present invention, the GUI is used to allow a user to create a query data object. When a query data object is created, a property sheet, i.e., a dialog box or panel, is displayed to allow a user either to select a predefined query, i.e., an external query, or to input a new query. Additional dialog boxes can be used to define a query data object. For example, a tables/columns dialog box can be used to display a list of tables, i.e., relations, and columns within a table. From this dialog box, the table(s) and associated column(s) can be selected for inclusion in a query. A query can be created using the query tool 214 from the tool palette 204 of FIG. 2A.

A query can contain comments and can also contain bind and lexical references that can be defined at runtime. Bind references are used to replace a single value in a query statement. For example, bind references can be used to replace expressions in the select, where, group by, order by, having, connect by, and start with clauses of queries. Lexical references are used as place holders for text embedded in a query. Virtually any portion of any part of the select statement can be included in a lexical reference. For example, lexical references can be used to replace clauses appearing after select, from, where, group by, order by, having, connect by, and start with. The value for the bind or lexical reference is associated with a parameter. A query includes other properties: name and maximum rows. The name property provides the ability to identify the query statement by a name. The maximum rows property limits the number of rows of data retrieved by the query statement. Rows that are not retrieved beyond the maximum rows value are omitted from the report or any calculations included in the report. Additional properties can be associated with a query data model object without departing from the scope of the present invention.

Thus, the present invention provides an enhanced, graphical data model and GUI for graphically specifying the data items and data computations to be performed on the data. Unlike the prior art that assumed that data is obtained using a single query, the present invention allows the use of multiple queries each containing one or more break groups and cross product groups where groups belonging to two different queries are connected by link objects. The resulting structure is therefore a forest of groups where each group contains one or more columns, thereby enlarging the scope of report definition tools available to users. The following is a description of the layout aspect for presenting a fuller description of the enlarged data engine of the present invention.

Layout Model and Layout Painter

FIG. 2B illustrates a layout painter 252 of the GUI 102 for specifying the layout objects of a report layout. Like the data model painter 202, the layout painter 252 includes a tool palette 254, painting region 256, and a status line 258. The painting region 256 is the area in which objects can be created, modified, positioned or deleted using their graphical representations. In the painting region 256, the size, relative position, patterns, colors, and fonts for an object can be specified. The settings of an object can be viewed by selecting an object and opening its property sheet.

The tool palette 254 contains the following tools: select 261, select individual object 262, rotate 263, rotate individual object 264, magnify/demagnify 265, reshape 266, rectangle 267, line 268, ellipse 269, arc 270, polygon 271, poly line 272, rounded rectangle 273, freehad 274, text 275, frame select 276, frame 277, repeating frame 278, field 279, boilerplate link 280, chart display 281, anchor 282, and default layout 283. The frame and repeating frame tools can be used to create a frame and a repeating frame, respectively. The field tool can be used to create a field. A boilerplate link tool can be used to create a boilerplate object that is read from a file. An anchor tool can be used to anchor two objects together. To facilitate layout definition, default layouts can be provided as a mechanism to automatically generate all or a portion of the layout of a report. The default layout tool defined in the data model painter creates the necessary objects based on the data model defined in the data model painter. The chart display tool creates embedded charts based on data fetched in the report.

The layout aspect, or layout model, is composed of report layout objects. Like the data model objects described above, layout objects can be defined using a GUI and are used to generate a layout in which the data item selections are output. Layout objects including repeating frame, frame, field, boilerplate, anchor, matrix, boilerplate link and chart display are described separately below. The common layout object properties include: Comment, Format Trigger, Horizontal Sizing, Keep With Anchoring Object, Name, Page Break After, Page Break Before, Page Protect, Print Condition Object, Print Condition Type, Printer Codes, and Vertical Sizing.

The "comment" common property can be used to document the layout object. The "format trigger" property can be used to specify a function that is executed before the object is formatted. The trigger can be used to determine if the object should appear in the report and also to dynamically change the formatting attributes of the object. The horizontal and vertical sizing properties can be used to specify how the horizontal and vertical size of the object can change at runtime to accommodate the objects or data within the object.

The "keep with anchoring object" property indicates whether an object is to be kept on the same page with the object to which it is anchored. Thus, if an object or the object to which it is anchored cannot both fit on the same page, they are both moved to the next page. The "name" property defines the name to identify the object. The "page break after" property of object A means that all objects formatted after object A should be moved to the next page. The "page break before" property indicates that the object is to be formatted on the page after the page on which it is initially triggered to print.

The "page protect" property indicates whether to attempt to retain the entire object and its contents on the same page. Print condition types can be ALL, ALL BUT FIRST, ALL BUT LAST, FIRST, and LAST. The "print condition type" property identifies the frequency with which an object is to appear in the report. The "print condition object" defines the object on which to base the "print condition type" property of the current object. For example, if a print condition type is set to "all" and the print condition object is set to "anchoring object," the current object is triggered to print on every page on which its anchoring object, i.e., parent object, appears.

Printer code properties apply when sending the report output to a character oriented printer. They identify strings to be sent out to the printer, either before or after the objected gets printed. They are typically used to set the printer into a given mode (e.g. underline, italic, etc.) when printing an object.

Anchor

An anchor object provides the ability to fasten an edge of one object to an edge of another object to ensure their relative position. For example, an anchor can anchor boilerplate text to the edge of a variable-sized repeating frame. Anchors are used to determine the vertical and horizontal positioning of a child object relative to its parent. The anchor layout object can therefore guarantee the boilerplate's distance and position in relation to the repeating frame regardless of any size changes. It is not per se an object but rather is an association between two objects. Therefore it does not inherit the common properties.

The anchor layout object includes the % Child, % Parent, Child, Child Edge, Collapse Horizontally, Collapse Vertically, Parent, and Parent Edge properties. The "% child" property defines the percentage down or across the edge of the child object on which the anchor is located. The "% parent" defines the percentage down or across the edge of the parent object on which the anchor is located. The edge properties (i.e., edge child and edge parent) define the edge of the object (child or parent) on which the anchor is located (e.g. BOTTOM, LEFT, RIGHT, TOP).

The "collapse horizontally" property indicates whether the anchor has zero width if the parent object does not print. That is, when the parent object does not print, this property defines whether the child object moves horizontally into the space vacated by the parent. The child property is the name of the child object. The parent property defines the parent object. The "collapse vertically" property indicates whether the anchor has zero height if the parent object does not print.

Boilerplate Objects

A Boilerplate object refers collectively to Arc, Ellipse, Freehand, Image, Line, Polygon, Polyline, Rectangle, Rounded Rectangle, and Text Boilerplate objects. A boilerplate object is created using the arc tool, ellipse tool, rectangle tool, etc. Each one has its own respective tool. In the preferred embodiment, there are no other properties for these objects than the common ones. None of the objects has vertical sizing and horizontal sizing except for a text object. In addition to the common properties, boilerplate text objects have a minimum widow line property as defined below for fields.

Boilerplate Link

A boilerplate link is created with the boilerplate link tool. A boilerplate link consists of text or graphics that appear in a report every time it is run where the contents are read in from a file at runtime. An example of a boilerplate link is the company logo that appears at the top of a report. In addition to the common layout object properties, the boilerplate link layout object includes the format, link file, and minimum widow lines.

The "link file" property indicates the name of the file to which the boilerplate is linked. A link file is advantageous for storing the contents of a boilerplate that is likely to change that is shared among multiple reports. The format property defines the format of the file displayed in the "link file" property. The "minimum widow lines" property defines the minimum number of lines of the boilerplate that may appear on a page where the object starts to print if the length file is a text file.

Chart Display

A chart display object is created using the Chart Display tool. The chart display object identifies a chart to be embedded in the report. The chart display object is built in the preferred embodiment using a chart building tool such as Oracle Graphics produced by Oracle Corporation of Redwood Shores, Calif. Any suitable chart building tool can be utilized. The properties of chart display objects are the chart display name, chart display query, source group, a mapping between the report columns and parameters and the chart columns, and a mapping between the report columns and parameters and the chart parameters.

The chart display name identifies the filename of the chart to be embedded in the report. There are two modes with which the data for these charts can be retrieved. In the first mode, the chart building tool fetches the data itself and builds the chart out of the data it fetches. If the chart is parametrized, the mapping between the report columns and parameters and the chart parameters is used to fill in the parameters. In the second mode, the present invention fetches the data and passes it to the chart building tool to base its chart on the report's data. In this mode, the source group property identifies the data group that contains the data to be charted, and the chart display query identifies the query in the chart to receive the report's data. The mapping between the report columns and parameters and the chart columns is used to map the column names between the present invention and the chart building tool.

Field

A field is created using the field tool. A field acts as a placeholder for columns in a database and is used to define the formatting attributes of the columns in a report. A field is one of the objects that can be located inside a frame or repeating frame. It is placed inside a repeating frame having a source group that is the group (or the descendant of the group) containing the field's source column. In addition to the common layout object properties, the field layout object includes the data type, format mask, hidden, minimum widow lines, name, page numbering, and source properties.

The datatype property displays the datatype of the field's source. The "format mask" property defines the format to display date and number values in the field. The hidden property indicates that the field is not formatted. Hidden fields are fields that are only referenced in boilerplate text. The "minimum widow lines" property defines the minimum number of lines of the field that should appear on the page where the field starts to print.

The "page numbering" property defines the manner in which page numbers are calculated. This applies to fields whose source is a page number. The source property defines the object (e.g., column or parameter) from which the field gets its value.

Frame

A frame is created using the frame tool. A frame is a layout object used to surround other layout objects and provides the ability to control multiple objects simultaneously. A frame can be used, for example, to surround several other layout objects thereby assuring that these objects are kept together on the same page in the report. There are no other properties for a frame other than the common properties.

Matrix

A matrix object is created with the create matrix menu item from the GUI. A matrix layout object formats the four sets of data necessary for a cross-tabulation of four sets of data. One set of data displays across the page, and another set of data displays down the page. Yet another set of data is the cross product determining all possible locations in which the across and down data relate and placing a cell in those locations. A fourth set of data displays as the "filler" of the cells. The matrix object defines the intersection of at least two repeating frames, which are the dimensions of the matrix. The matrix object contains the field that is to hold the "filler" or values of the cell group. The common layout object properties do not apply. Properties of the matrix layout object include Comment, Cross Product Group, Horizontal Repeating Frame, Name, and Vertical Repeating Frame.

The Comment property is used to document the layout object. The "Cross Product Group" property defines the group that contains the source groups of the horizontal and vertical frames. The Cross Product Group correlates values between one or more groups to produce the data in the matrix. The "Horizontal Repeating Frame" property indicates the repeating frame having values that produce the row headings and summaries and that help to compute the cross product for the matrix. The Name property identifies the name of the matrix object. The "Vertical Repeating Frame" property indicates the repeating frame having values that produce the column headings and summaries and that help compute the cross product for the matrix.

Repeating Frame

A repeating frame is created using the repeating frame tool. A repeating frame acts as a placeholder for a group data object and is used to traverse the break values of a group allowing it to display the values of its columns using layout fields. Repeating frames repeat as often as there are break values of the source group. In addition to the common layout object properties described above, the repeating frame layout object includes the column mode, maximum records per page, minimum widow records, print direction, source, vertical spacing and horizontal spacing properties.

The "column mode" property controls how data is fetched and formatted for instances of repeating frames. it is useful when instances of repeating frames repeat across the page, and given instance I is too big to fit on the single page. When Column mode is set to on, the next instance J can start formatting on the same page where instance I started formatting. When column mode is set to off, instance J can not start formatting until Instance I finishes formatting on the next page or pages. The "horizontal spacing" property defines the amount of horizontal space between instances of a repeating frame. The "vertical spacing" property defines the amount of vertical space between instances of the repeating frame. The "maximum records per page" property specifies the maximum number of instances of the repeating frame to be formatted on a page.

The "minimum widow records" property defines the minimum number of instances that should appear on the page where the repeating frame starts to print. If at the end of a page, there are formatted less instances of the repeating frame than the minimum, the instances will get moved to the next page. The print direction defines the direction (e.g., across, across/down, down, down/across) in which successive instances of the repeating frame appear.

The source property identifies the group that owns the data for the repeating frame. A list of values containing valid source groups can be provided to facilitate identification.

Report Generation According to the Present Invention

The objects defined using the GUIs, described above, are used to control the behavior of the report at runtime. The report definition created using the front-end tools provided in the GUIs can be used by a back-end engine, which is composed of multiple modules, to generate report output.

Figure 4:
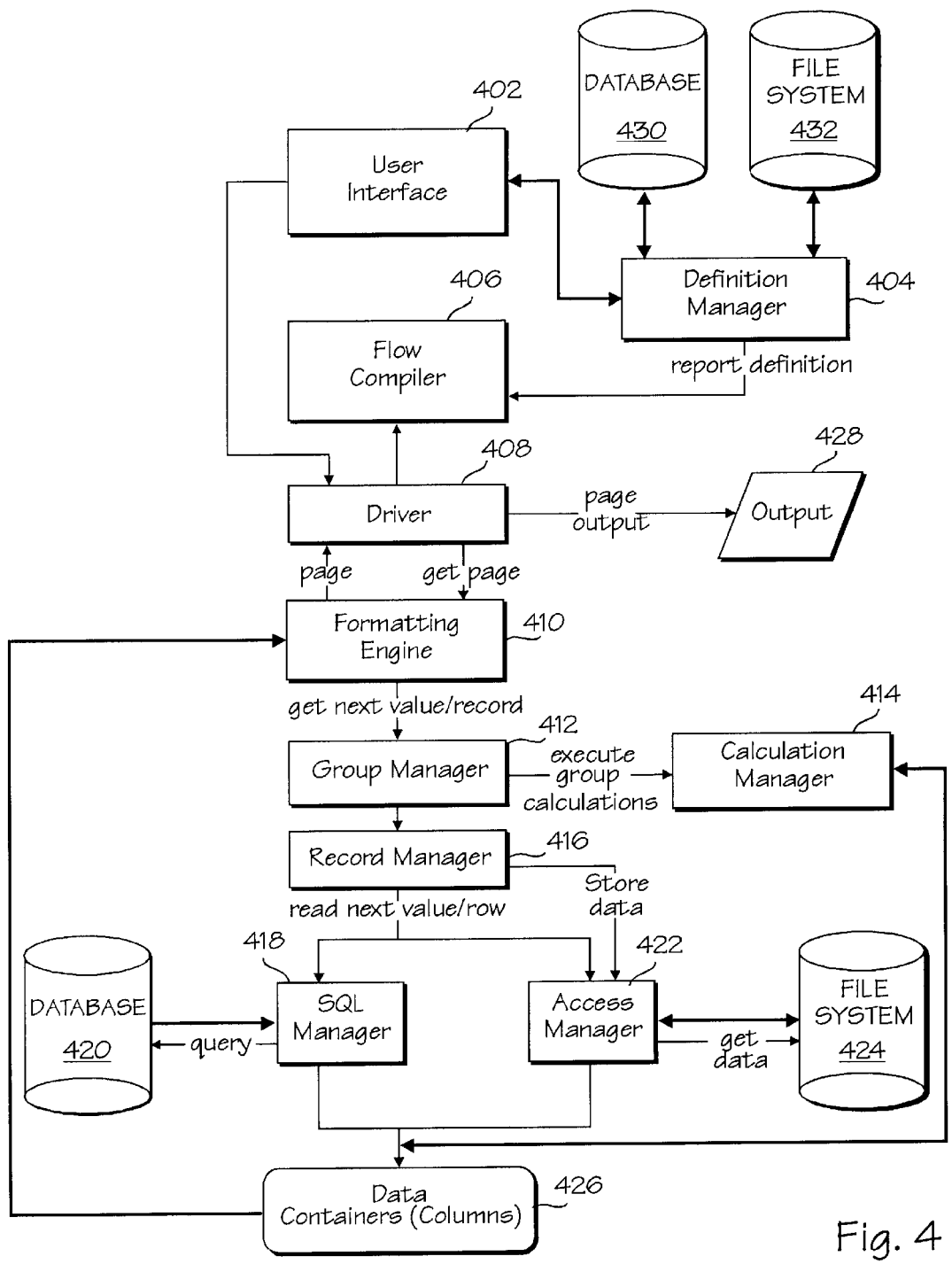
FIG. 4 illustrates a report generation process including front-end and back-end engine.

FIG. 4 illustrates a report generation process including front-end and back-end engine according to the present invention. As previously described, the user interface 402 (102) is used to define the report, i.e., the data model and layout objects that comprise and define the report. The definition manager 404 creates and stores the data model and layout objects for the report in the report definition. The definition manager 404 manages the storage, update, deletion, retrieval, and closing of reports that are stored in a database 430 or file system 432.

The flow compiler 406 creates the structures that are needed by the back-end. The flow compiler 406 traverses the data model tree and the layout tree stored by the definition manager 404 and builds data structures for the formatter 410 and the data, group, record, calculation, SQL, and access managers. The flow compiler 406 creates all of the implicit anchors and processes variables and lexical parameters. The flow compiler 406 organizes the correct flow of the report at execution time. It determines the correct behavior of the report.

After the report has been defined, the objects created and the layout defined, the report definition can be transferred to the back-end to generate output. A driver 408 for the back-end drives the components of the back-end. Thus, once data structures generated by the flow compiler 406 are stored in the global context structure, control is given to the driver 408. The driver 408 transmits a "get page" request to the formatter 410, which coordinates the report output generation. The formatter 410 operates on an object, or definition, tree, where each node of the tree describes a layout object and illustrates the dependencies among the objects. On each page and for each node of the tree, the formatter 410 formats as much data as can fit on the current page. A report is completed when each node of the tree is completely formatted.

For each node representing a repeating frame, the formatter 410 invokes the group manager 412 when a new instance of a node is to be formatted. The group manager 412 determines whether a new instance of the corresponding group exists and sets all the appropriate data pointers on that instance. For each node representing a field, the formatter 410 further invokes the group manager 412 to ensure that the field's source column is loaded with the value corresponding to the current instance of its group.

The group manager 412 responds to the requests of the formatter 410. The group manager 412 maintains the data pointers used by the formatter 410 and ensures that the data described in the data model are properly fetched, filtered, stored and processed. The group manager 412 attempts to fetch and process data only when such data is needed to satisfy the formatter's requests. Processing of data by the group manager 412 includes filtering, executing summaries and formulae using the calculation manager 414, and processing cross products.

The calculation manager 414 performs any calculations defined in the report definition when invoked by the group manager 412. The record manager 416 is the interface between the group manager 412 and the SQL and Access managers 418 and 422, respectively. When the group manager 412 requires the retrieval of data, the group manager 412 makes a request to the record manager 416. The record manager 416 fetches the data through the SQL or Access managers. Further, the record manager 416 is responsible for implementing query links and storing data in the access manager 422.

In response to a request from the record manager 416, the SQL manager 418 provides queries to, and accesses the database 420 to fetch one or more rows of data from the database 420. The access manager 422 is a record caching mechanism for the back-end engine; it stores all the rows retrieved from the SQL manager 418 and the values of calculations. The access manager 422 maintains an index into the data cache; the index can be a B-tree index of the data. Access manager 422 sends "get data" commands to file system 424. Data (column values retrieved or calculated) that is to be output to a report is stored in data containers 426. When a report output unit (e.g., page) is generated, the driver 408 is notified. The driver 408 transmits the report output unit to output 428.

Illustration of Report Generation

Figure 5A:
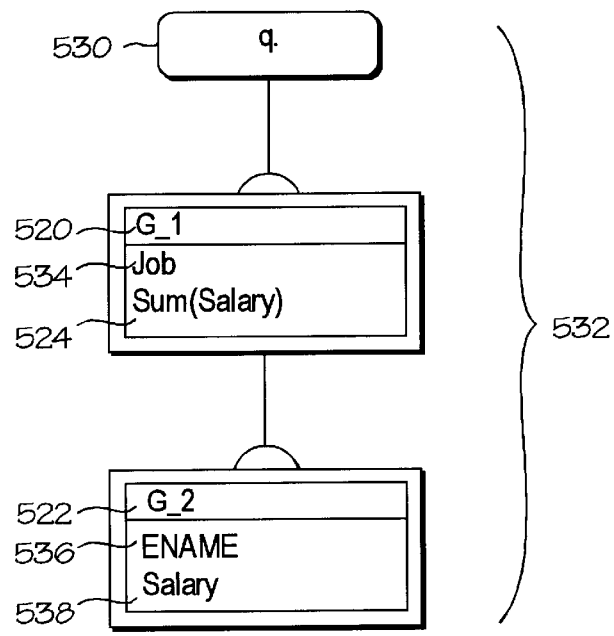
FIG. 5A illustrates a GUI representation of a data model layout.
Figure 5B:
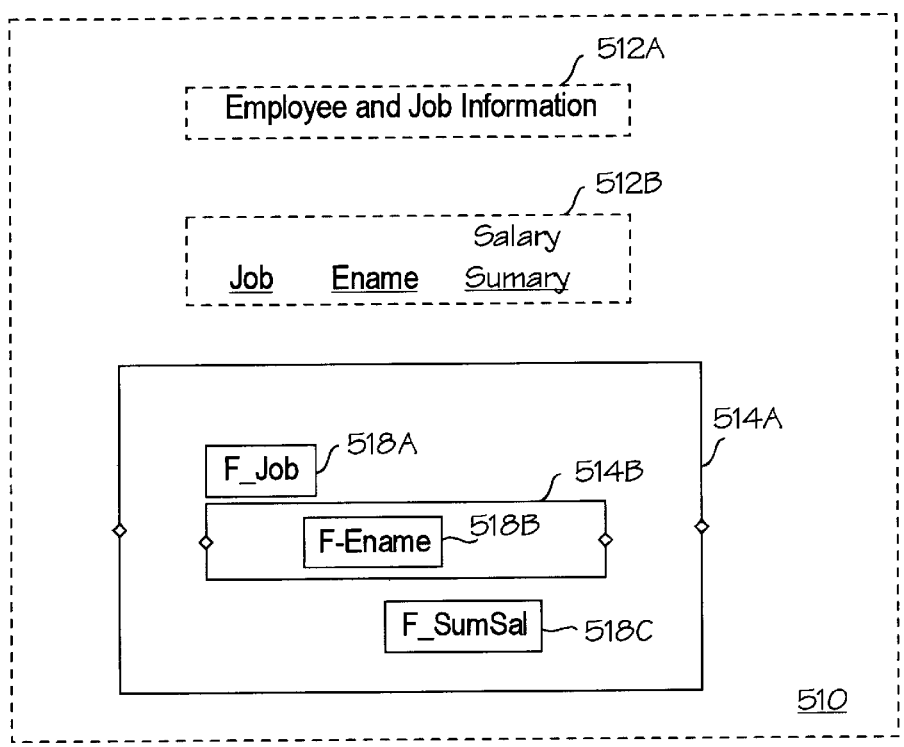
FIG. 5B illustrates a GUI representation of a report layout.

The following is an example of report generation using the back-end engine of FIG. 4 described above. FIGS. 5A and 5B, described below, are diagrams illustrating the GUI representations of the data model and report layouts, respectively, according to the present invention.

FIG. 5A illustrates a GUI representation of a data model layout 532 for a single query 530 that selects job 534, ename 536, and salary data 538 items from a database table. (The present application has equal application to multiple queries). There are two break groups, G_1 and G_2, 520 and 522, respectively. The G_1 break group 520 contains the job database item 534 and a summary 524 of the salary database items. The summary 524 of the salary values is performed in G_1 520 and is a summary of salaries by job. The G_2 break group 522 contains the employee name 536 and salary database 538 items.

FIG. 5B illustrates a GUI representation of a report layout 510 for this example. The data model objects of FIG. 5A provide the data sources for the layout objects of FIG. 5B. The layout 510 contains two boilerplate objects 512A and 512B. An inner repeating frame 514B contains F_Ename field 518B. The data source for F_Ename field 518B is the ename database item 536. An outer repeating frame 514A contains F_job field 518A and F_Sumsal field 518C. The data source for F_job field 518A and F_Sumsal 518C are the job database item 534 and the salary summary calculation 524, respectively.

Referring to FIG. 4, the GUI representations 532 and 510 illustrated in FIGS. 5A and 5B were created using user interface 402. Definition manager 404 uses the GUI representations 532 and 510 to create a report definition for use in creating report output.

Figure 6A:
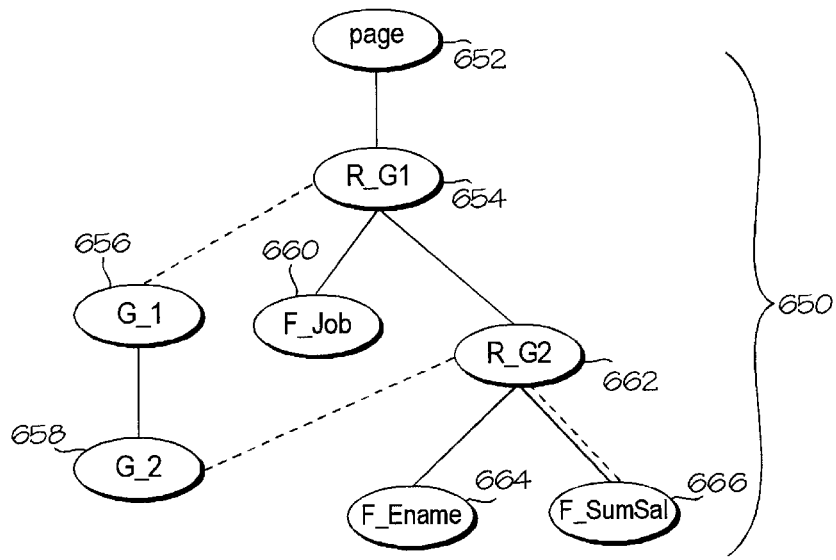
FIG. 6A illustrates a dependency tree.

FIG. 6A illustrates a dependency tree 650 that is created from the report definition. At the root of the tree 650 is a page object, or node 652. Under the root node 652, the R_G1 node 654 represents the outer repeating frame (i.e., 514A in FIG. 5B). A branch from the R_G1 node containing node 656 represents that group G_1 (i.e., 520 in FIG. 5A) is referenced in the outer repeating frame 514A. Further, the dependency tree 650 illustrates that the node 660 for the F_job field 518A and node 662 for the inner repeating frame (i.e., 514B in FIG. 5B) are contained in the R_G1 node 654 for the repeating frame 514A. The node 658 for the G_2 break group 522 is referenced, node 664 for F_Ename 518B is contained, and node 666 for F_Sumsal 518C is an external child of the R_G2 node 662 for the inner repeating frame 514B.

Referring to FIG. 4, the flow compiler 406 generates the dependency tree 650 and builds data structures to be used by the rest of the back-end engine. The flow compiler 406 then passes control to the driver 408. The driver 408 manages the remainder of the back-end engine. The driver 408 requests a page of output from the formatter 410. The formatter 410 begins to traverse the dependency tree 650 and encounters the outer repeating frame (514A in FIG. 5B) represented by node 654 of FIG. 6A.

The formatter 410 makes a call to the group manager 412 to request the next or first value or record. In this example, records are initially obtained from the database 420. Further, one record is read at a time. However, all of the records can be read at one time and cached. Because all of the data may not be needed, single record reads are efficient when a report is to be displayed one screen at a time. However, if a printout of the report is the desired output, it may be more efficient to read all of the records at one time. Once a record is read, it can be cached by the access manager 422. Therefore, a record must only be read from the database 420 once. The record manager 416 generates a next, or first, value/record request to the access manager 422 to determine whether the request can be satisfied by a record in cache.

Figure 6B:
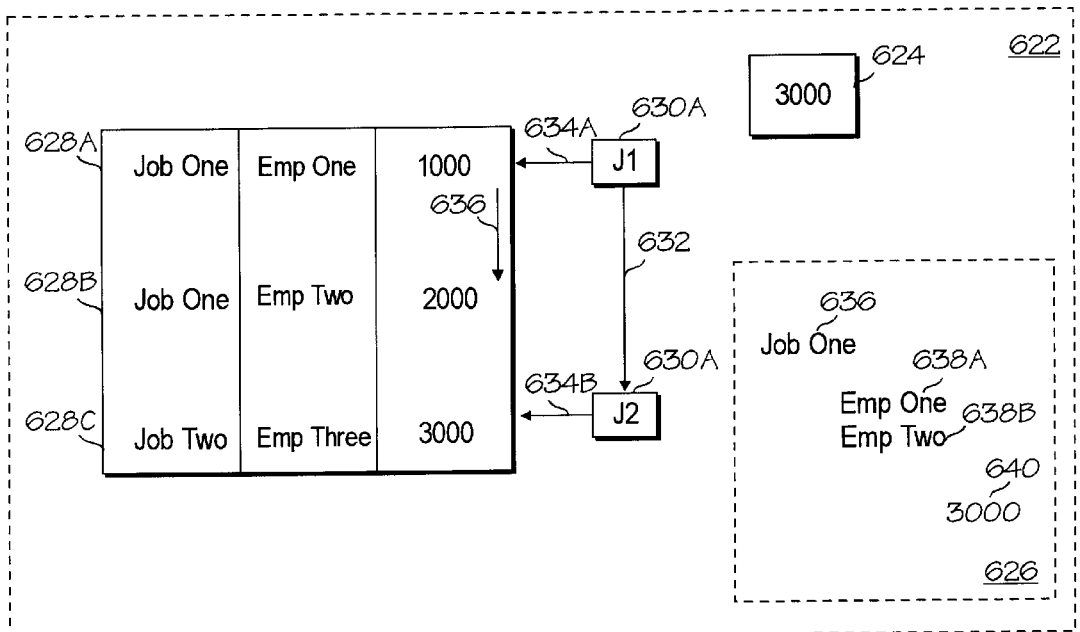
FIG. 6B illustrates a cache maintained during report generation.

Because this is the first request for data, there are no records stored in cache. Therefore, the record manager 416 makes a request to the SQL manager 418 to get the first record. The SQL manager 418 reads a record from database 420. The record is then cached by the access manager 422. FIG. 6B illustrates a cache 622 maintained during report generation. The first record is stored in cache entry 628A of cache 622. Further, index entry 630A is created to identify the first record in which the job data item value is equal to "Job One." Pointer 634A associates index entry 630A with cache entry 628A.

The record manager 416 requests the record from the access manager 422. The access manager 422 copies the values (i.e., Job One, Emp One, 1000) to data containers or columns (i.e., 426 in FIG. 4). The access manager 422 then executes a successful return to the record manager 416. The record manager 416 executes a successful return to the group manager 412. The group manager 412 returns the values to the formatter 410 to format a page object.

The formatter 410 can call the group manager 412 to verify that the right value is loaded for the job field. Once verified, the formatter 410 can load the job value in job field 636 of page object 626 in cache. The formatter 410 then reviews the dependency tree 650 of FIG. 6A to determine the next tree object (i.e., R_G2 node 662). The formatter 410 generates another request to group manager 412 to obtain the next/first record in group two. The group manager 412 generates a request for the next/first record at level one. This request can be satisfied by the data contained in cache entry 628A (i.e., "Emp One"). Therefore, a call to the access manager 422 can satisfy the request. Once the employee field is read, a cursor can be set to indicate that the employee field of cache entry 628A has been read. Processing returns to the record manager 416 and the group manager 412 and indicates a successful completion.

The group manager 412 determines that a summary must be made for the salary column. The group manager 412 calls the calculation manager 414 to calculate the summary. The calculation manager 414 computes the summary by adding the current record's salary field value to the current value of the salary summary (i.e., when the first calculation is performed, the summary value is zero). The current value of the summary calculation is cached inside calculation manager data structures. When completed it is stored in cache entry 624.

The next record is obtained from the database 420 in a similar manner. Index entry 630A continues to point to the first cache entry that contains the first record for Job One (i.e., 628A). Further, pointer 636 is created to link the cache entries that share the same job values (i.e., to link entries 628A and 628B). A return to the group manager 412 causes a call to the calculation manager 414 to add the second record's salary value to the current summary value. The current value salary summary (i.e., 3000) is cached inside calculation manager data structures. When completed, it is stored in cache entry 624.

The formatter 410 formats the second row and stores report item 638B in page object 626. This process can be repeated for all employees that have a job value equal to "Job One." When a new job value is encountered (e.g., the third database record in this example), the new record is cached, another index entry (e.g., 630B) is created, and the record manager 416 transmits an "unsuccessful" return to the group manager 412. Based on the unsuccessful return, the group manager 412 determines that it is finished with the current job (i.e., "Job One"). The group manager 412 returns to the formatter 410 indicating that there are no more records for the current value in break group one and now that the summary is completed it stores its value in cache entry 624.

The first instance of the R_G2 repeating frame is filled. The formatter 410 can now process the report objects that are positionally dependent on the R_G2 repeating frame (i.e., the salary summary). The formatter 410 obtains the summary of the salary from cache entry 624 and places it in page object 626 (i.e., report item 640). Because the summary is the only positionally dependent report object to be processed, the formatter 410 can begin to process the next instance of the R_G1 repeating frame (i.e., cache entry 628C). The process repeats until all of the database records have been processed.

Thus, the present invention provides a graphical data model and a GUI that allows users to graphically specify both the data and computations to be performed on the data using the layout-like painter to specify the data. Whereas the prior art assumed the data to be coming from a single query, the present invention allows the use of multiple queries each containing one or more break groups and cross product groups where groups belonging to two different queries are connected by link objects. The resulting structure is therefore a forest of groups where each group contains one or more columns, thereby enlarging the scope of report definition tools available to users. As well as providing a robust set of data model objects, the present invention provides a data model painter for creating, defining, and visualizing the data model objects and has a powerful data engine that retrieves the data according to the definition of the data objects.

Therefore, the present invention provides a novel report generation tool for developing, displaying and printing reports using a non-procedural, declarative approach that fully shifts the emphasis in report definition from program development to report design for both layout and data aspects. It also facilitates maintenance of existing reports. The declarative approach of the present invention provides an environment where a report definition is assembled by building objects and giving attributes to these objects. It significantly reduces the amount of programming required to define a report and greatly enhances the ease with which the report is defined.

Computer System

Figure 7:
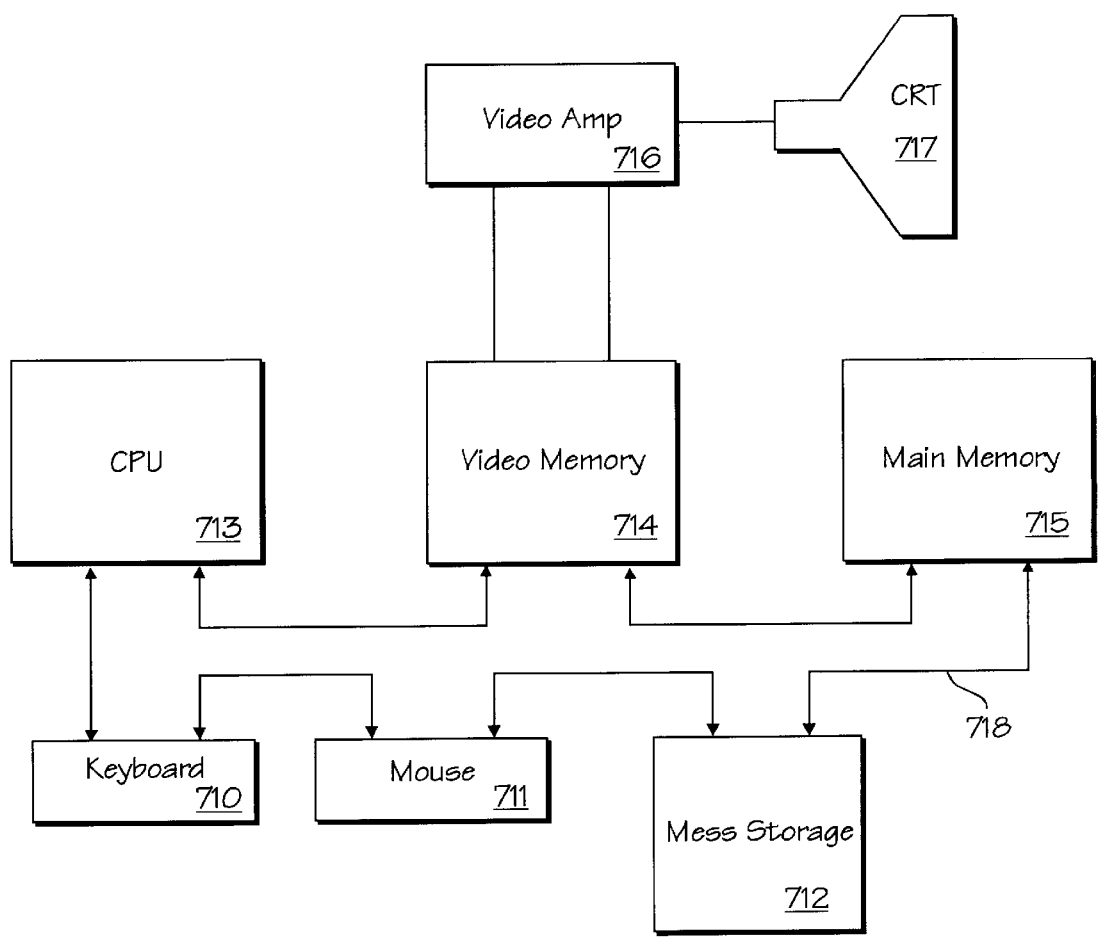
FIG. 7 illustrates a computer system for implementing the present invention.

The present invention can be implemented on a general purpose computer such as illustrated in FIG. 7. A keyboard 710 and mouse 711 are coupled to a bi-directional system bus 718. The keyboard and mouse are for introducing user input to the computer system and communicating that user input to CPU 713. The computer system of FIG. 7 also includes a video memory 714, main memory 715 and mass storage 712, all coupled to bi-directional system bus 718 along with keyboard 710, mouse 711 and CPU 713. The mass storage 712 may include both fixed and removable media, such as magnetic, optical or magnetic optical storage systems or any other available mass storage technology. Bus 718 may contain, for example, 32 address lines for addressing video memory 714 or main memory 715. The system bus 718 also includes, for example, a 32-bit DATA bus for transferring DATA between and among the components, such as CPU 713, main memory 715, video memory 714 and mass storage 712. Alternatively, multiplex DATA/address lines may be used instead of separate DATA and address lines.

In the preferred embodiment of this invention, the CPU 713 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable means. This circuitry converts pixel DATA stored in video memory 714 to a raster signal suitable for use by monitor 717. Monitor 717 is a type of monitor suitable for displaying graphic images.

The computer system described above is for purposes of example only. The present invention may be implemented in any type of computer system or programming or processing environment.

Thus, a method and apparatus for declarative report definition and generation using an enhanced, graphical data model and a graphical user interface for graphically specifying data items and data computations to be performed on the data are provided.

What is claimed is:

1. A computer implemented method of defining a data report, said method comprising the steps of:

defining, using a definition manager having a graphical user interface (GUI), a data model of said data report consisting of data model objects, said data model graphically representing data items selected from a database to be included in said data report, wherein said data model is defined by joining a plurality of queries, said data model includes a query data object used to select a predefined query or generate a new query; and defining, using said definition manager, a layout model of said report consisting of layout model objects, said layout model graphically representing a physical layout format of said report.

2. The method of claim 1 wherein said data model further graphically represents data item relationships and computations to be performed between at least two data items.

3. The method of claim 1 wherein said data model objects include a Column, a Group, a Link, and a Query.

4. The method of claim 1 wherein said layout objects include an Anchor, a Boilerplate, a Boilerplate Link, a Chart Display, a Field, a Frame, a Matrix, and a Repeating Frame.

5. A computer implemented method of generating a data report, said data report consisting of data items selected from a database, said method comprising the steps of:

a) defining data properties of said data report by using a graphical user interface (GUI) to generate a data model object, said data model object graphically representing said data properties of said data report and further representing data items selected from said database to be included in said data report, wherein said data model is defined by joining a plurality of queries, said data model object includes a query data object used to select a predefined query or generate a new query;

b) generating a layout object of said data report by using said graphical user interface, wherein said layout object graphically represents a physical layout format of said data report; and c) retrieving, via a data engine, said data report in accordance with said data model object and said layout object.

6. The method of claim 5, wherein said data model object further graphically represents relationships between at least two of said data items.

7. The method of claim 6, wherein said data model object further graphically represents computations to be performed between at least two of said data items.

8. The method of claim 5, wherein said data model object includes a query data object, said query data object is used to select a predefined query or generate a new query.

9. The method of claim 5, wherein said data model object includes a link data object, said link data object is used to generate a parent-child Group relationship between at least two Groups.

10. The method of claim 5, wherein said data model object includes a break group, said break group is used to determine a hierarchy of said data items in said data report.

11. The method of claim 5, wherein said data model object includes a cross product data object, said cross product data object is used to generate a group comprising of values generated by performing a mathematical operation between corresponding data items of at least two groups.

12. The method of claim 5, wherein said data model object includes a parameter data object, said parameter data object provides an ability to modify said data report at a runtime of said data report.

13. The method of claim 12, wherein said parameter data object further provides an ability to change a selection criteria and a mathematical operation at said runtime.

14. The method of claim 5, wherein said data model object includes a column data object, said column data object provides an ability to generate summaries and computations on column values with in a Group.

15. A computer-readable medium having stored thereon data representing sequences of instructions for generating a data report, said data report comprised of data items included in a database, said sequences of instruction which, when executed by a processor, cause said processor to perform the steps of:

a) defining data properties of said data report by using a graphical user interface (GUI) to generate a data model object, said data model object graphically representing said data properties of said data report and further representing data items selected from said database to be included in said data report, wherein said data model is defined by joining a plurality of queries, said data model object includes a query data object used to select a predefined query or generate a new query;

b) generating a layout object of said data report by using said graphical user interface, wherein said layout object graphically represents a physical layout format of said data report; and c) retrieving, via a data engine, said data report in accordance with said data model object and said layout object.

16. The computer-readable medium of claim 15, wherein said data model object further graphically represents relationships between at least two of said data items.

17. The computer-readable medium of claim 15, wherein said data model object further graphically represents computations to be performed between at least two of said data items.

18. The computer-readable medium of claim 15, wherein said data model object includes a query data object, said query data object is used to select a predefined query or generate a new query.

19. The computer-readable medium of claim 15, wherein said data model object includes a link data object, said link data object is used to generate a parent-child Group relationship between at least two Groups.

20. The computer-readable medium of claim 15, wherein said data model object includes a break group, said break group is used to determine a hierarchy of said data items in said data report.

21. The computer-readable medium of claim 15, wherein said data model object includes a cross product data object, said cross product data object is used to generate a group comprising of values generated by performing a mathematical operation between corresponding data items of at least two groups.

22. The computer-readable medium of claim 15, wherein said data model object includes a parameter data object, said parameter data object provides an ability to modify said data report at a runtime of said data report.

23. The computer-readable medium of claim 22, wherein said parameter data object further provides an ability to change a selection criteria and a mathematical operation at said runtime.

24. The computer-readable medium of claim 15, wherein said data model object includes a column data object, said column data object provides an ability to generate summaries and computations on column values with in a Group.

25. A computer system for generating a data report, said data report including data items selected from a database, said computer system comprising:

a graphical user interface configured to enable development of a data model object graphically representing data items included in said data report and data parameters of said data report, said data items selected from said database, wherein said data model is defined by joining a plurality of queries, said data model object includes a query data object used to select a predefined query or generate a new query;

said graphical user interface further configured to enable development of a layout model object, said layout model object graphically representing physical layout format parameters of said report; and a data engine for retrieving said data report having said data items selected from said database, and said data report retrieved in accordance with said data parameters and said physical layout format parameters.

26. The computer system of claim 25, wherein said data model object further graphically represents a relationship between at least two of said data items.

27. The computer system of claim 25, wherein said data model object further graphically represents computations to be performed between at least two of said data items.

* * * * *